(12) United States Patent
McCuller (10) Patent No.: US 8,908,776 B1
(45) Date of Patent: *Dec. 9, 2014

(54) ATTENTION MISDIRECTION FOR STREAMING VIDEO

(71) Applicant: Amazon Technologies, Inc., Reno, NV (US)

(72) Inventor: Patrick G. McCuller, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/044,209

(22) Filed: Oct. 2, 2013

Related U.S. Application Data

(63) Continuation of application No. 12/956,693, filed on Nov. 30, 2010, now Pat. No. 8,565,323.

(51) Int. Cl.
H04N 5/262 (2006.01)
H04N 7/12 (2006.01)
H04N 11/00 (2006.01)

(52) U.S. Cl.
USPC ............ 375/240.27; 348/425.2; 348/466

(58) Field of Classification Search
CPC ............. H04N 7/50; H04N 7/68; H04N 7/64; H04N 7/26244; H04N 21/2383
USPC ...................................... 375/240.27
See application file for complete search history.

(56) References Cited

U.S. PATENT DOCUMENTS

| | | | |
|---|---|---|---|
| 2006/0053442 A1* | 3/2006 | Ridderheim et al. | 725/32 |
| 2010/0150252 A1* | 6/2010 | Camp et al. | 375/240.27 |
| 2010/0150461 A1* | 6/2010 | Iwami | 382/233 |
| 2010/0195742 A1* | 8/2010 | Wu | 375/240.27 |
| 2010/0220175 A1* | 9/2010 | Claydon et al. | 348/43 |
| 2010/0283972 A1* | 11/2010 | Plant et al. | 351/210 |
| 2011/0054649 A1* | 3/2011 | Sarkis et al. | 700/94 |
| 2011/0258656 A1* | 10/2011 | Michel | 725/27 |
| 2012/0271194 A1* | 10/2012 | MacLullich et al. | 600/558 |

* cited by examiner

Primary Examiner — Dave Czekaj
Assistant Examiner — Nam Pham
(74) Attorney, Agent, or Firm — Thomas | Horstemeyer, LLP (57) ABSTRACT

Disclosed are various embodiments that implement attention misdirection to conceal errors or anomalies in video signals. It is determined whether an error in a video signal may be user perceivable. If the error may be user perceivable, a distraction is generated that is designed to interfere with perception of the error by a user.

20 Claims, 6 Drawing Sheets

ATTENTION MISDIRECTION FOR STREAMING VIDEO

CROSS-REFERENCE TO RELATED APPLICATIONS

This application is a continuation of, and claims priority to, co-pending U.S. patent application entitled "ATTENTION MISDIRECTION FOR STREAMING VIDEO," filed on Nov. 30, 2010, and assigned application Ser. No. 12/956,693, which is incorporated herein by reference in its entirety.

BACKGROUND

Video streams over networks often are susceptible to quality problems. For example, the Internet is a best-effort network with no quality-of-service guarantees. One or more packets of the video stream may be randomly lost because of equipment malfunctions, bursty network traffic, communications signal interference, or any number of other reasons. Such lost packets may result in various glitches in the video that is rendered for viewing. Additionally, depending on the video encoding technology employed in generating the video stream, blurriness, fuzziness, macroblocking, pixelation, "mosquito noise," and/or other forms of encoding artifacts may appear in the rendered video.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

The present disclosure relates to misdirecting the attention of a user to mask errors in streaming video. In particular, the present disclosure relates to presenting a distraction in conjunction with streaming video to induce a saccade in a user. A saccade is a rapid movement of the eyes as they jump from fixation on one point to another. When a person shifts visual focus to something that is moving, the person perceives a smooth visual experience. However, the actual physiology involved differs from the perception. In reality, the eye unfocuses, the muscles controlling the eye aim the eye to focus on another object, and the eye refocuses on the other object. During this time, which may last approximately between 30 and 50 milliseconds, the visual field is edited out by the brain, and the brain fills in the gap.

If something unusual occurs in the visual field during the saccade, the user does not perceive it due to this saccadic masking phenomenon. Various embodiments of the present disclosure employ saccade-inducing distractions to mask anomalies in a video stream. Such anomalies, or errors, may be created, for example, by encoding artifacts, data communications network effects, and/or other factors. In various embodiments, the video stream is encoded from a video signal generated by a game or other application that is executed in a server. It is understood, however, that the principles of the present disclosure may be applied to any video stream that is susceptible to visual anomalies. In the following discussion, a general description of the system and its components is provided, followed by a discussion of the operation of the same.

Figure 1:
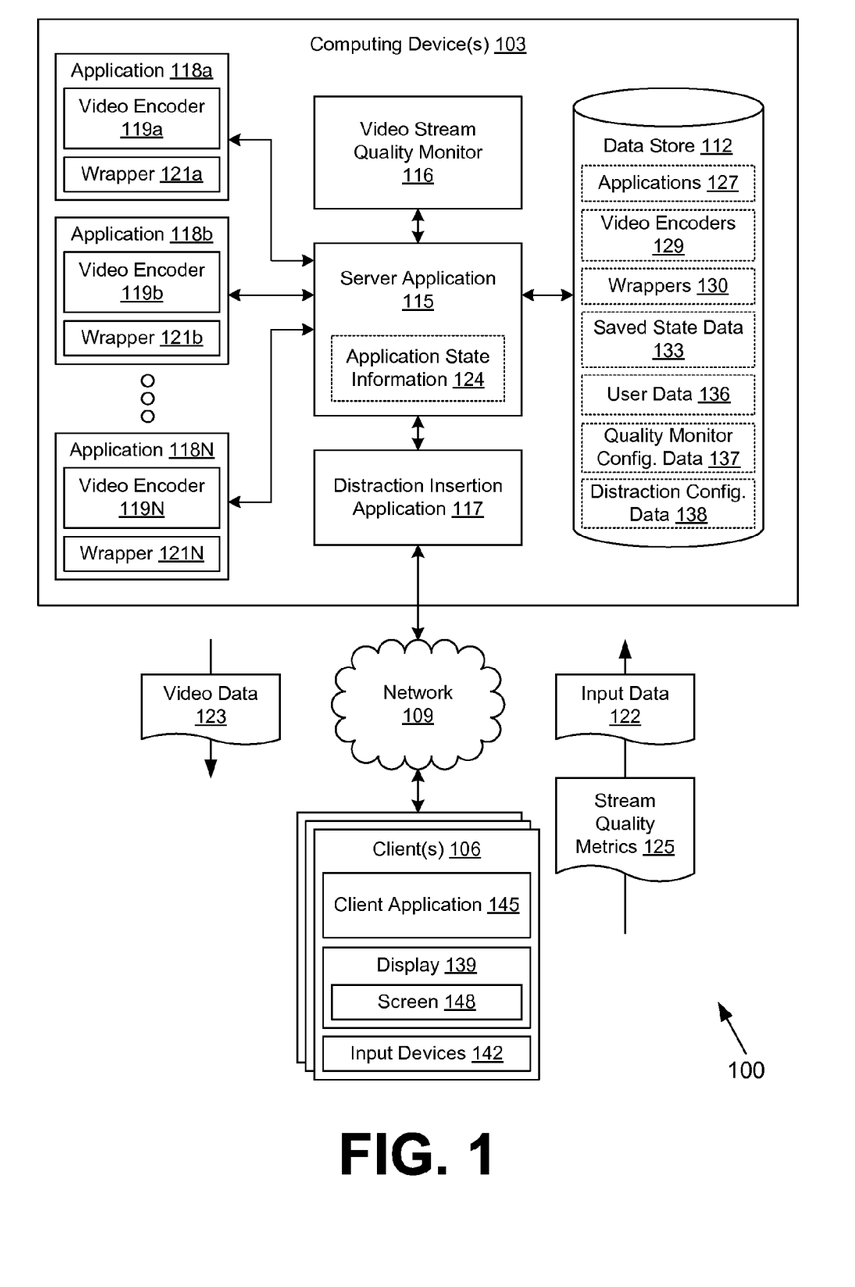
FIG. 1 is a drawing of a networked environment according to various embodiments of the present disclosure.

With reference to FIG. 1, shown is a networked environment 100 according to various embodiments. The networked environment 100 includes one or more computing devices 103 in data communication with one or more clients 106 by way of a network 109. The network 109 includes, for example, the Internet, intranets, extranets, wide area networks (WANs), local area networks (LANs), wired networks, wireless networks, or other suitable networks, etc., or any combination of two or more such networks.

The computing device 103 may comprise, for example, a server computer or any other system providing computing capability. Alternatively, a plurality of computing devices 103 may be employed that are arranged, for example, in one or more server banks or computer banks or other arrangements. For example, a plurality of networked computing devices 103 together may comprise a cloud computing resource, a grid computing resource, and/or any other distributed computing arrangement. Such computing devices 103 may be located in a single installation or may be distributed among many different geographical locations. For purposes of convenience, the computing device 103 is referred to herein in the singular. Even though the computing device 103 is referred to in the singular, it is understood that a plurality of computing devices 103 may be employed in the various arrangements as described above.

Various applications and/or other functionality may be executed in the computing device 103 according to various embodiments. Also, various data is stored in a data store 112 that is accessible to the computing device 103. The data store 112 may be representative of a plurality of data stores 112 as can be appreciated. The data stored in the data store 112, for example, is associated with the operation of the various applications and/or functional entities described below.

The components executed on the computing device 103, for example, include a server application 115, a video stream quality monitor 116, a distraction insertion application 117, a plurality of applications 118a, 118b . . . 118N, a plurality of video encoders 119a, 119b . . . 119N, a plurality of wrappers 121a, 121b . . . 121N, and other applications, services, processes, systems, engines, or functionality not discussed in detail herein. The server application 115 is executed to launch applications 118, which may be executed within wrappers 121 that provide a virtualized environment. Although the principles of the present disclosure are illustrated with reference to applications 118 that are executed in remote servers, it is understood that the principles are applicable to any video stream that may have visual anomalies or errors, e.g., television streams, movie streams, and so on.

The server application 115 is executed to obtain input data 122 from the clients 106 and provide the input data 122 to the respective wrapper 121. The server application 115 is also executed to send video data 123 that is captured from the application 118 to the clients 106 as a video stream. The server application 115 may communicate with the client 106 over various protocols such as, for example, hypertext transfer protocol (HTTP), simple object access protocol (SOAP), real-time transport protocol (RTP), real time streaming protocol (RTSP), real time messaging protocol (RTMP), user datagram protocol (UDP), transmission control protocol (TCP), and/or other protocols for communicating data over the network 109. The server application 115 is configured to maintain application state information 124 associated with the executing applications 118.

The application 118 may be a single-player game, a multiple-player game, or include both single player and multiple player modes. As non-limiting examples, the application 118 may correspond to a first-person shooter game, an action game, an adventure game, a party game, a role-playing game, a simulation game, a strategy game, a vehicle simulation game, and/or other types of games. The application 118 may be a game originally designed for execution in a general-purpose computing device or in a specialized video game device such as, for example, a video game console, a handheld game device, an arcade game device, etc. The application 118 may expect to access one or more resources of the device on which it is executed. Such resources may correspond to display devices, input devices, or other devices. In some cases, the application 118 may request exclusive access to one or more of the resources, whereby no other applications may have access to the particular resources. Although the example of a game is used in the following text, it is understood that the application 118 may correspond to many different types of applications.

The video encoder 119 is able to encode a video signal generated by the application 118 into a video stream for transmission over the network 109 to clients 106. The video stream may include an audio signal generated by the application 118 as well. To this end, the video encoder 119 may include various types of video and audio encoders, such as, for example, Moving Pictures Experts Group (MPEG) encoders, H.264 encoders, Flash® video encoders, etc. Such encoders may be selected according to factors such as, for example, data reduction, encoding quality, latency, etc.

The video encoder 119 may introduce various encoding artifacts into the video stream that were not present in the video signal. Such encoding artifacts may comprise macroblocking, pixelation, "mosquito noise," and/or other forms of encoding artifacts. The presence and severity of the encoding artifacts may depend on various factors, such as the content of the video signal, the maximum bitrate of the video stream, the data reduction approach employed by the particular video encoder 119, etc. In some situations, the video signal may already contain preexisting artifacts. As a non-limiting example, the video signal may have already been encoded and contain encoding artifacts. As another non-limiting example, the video signal may be obtained from archival footage and may include scratches, dust, color changes, and/or other pre-existing artifacts.

The video stream quality monitor 116 is executed to monitor the quality of one or more video streams generated by one or more video encoders 119. To this end, the video stream quality monitor 116 may be configured to detect errors or visual anomalies in a video stream that may be user perceivable. Such errors may result from data from the video stream being delayed or lost over the network 109. Such network 109 effects may be assessed through feedback from the server application 115 or another application that is configured to serve up the video stream to the client 106 over the network 109. Additionally, such network 109 effects may be assessed by processing stream quality metrics 125 that are reported by the client 106. Errors in the video stream may also result from encoding artifacts introduced by the video encoder 119 or may be preexisting in the source video signal.

In some cases, errors in the video stream may be minor, transient, or of such a nature that they are not readily perceivable by the user. In such cases, the errors may not meet a threshold associated with user perception of the error. In other cases, such errors may be significant enough to attract the attention of the user and degrade the overall experience of the user. Some of these user-perceivable errors may be susceptible to saccadic masking. If so, the video stream quality monitor 116 configures the video stream to include a distraction to induce a saccade in the user, thereby interfering with the perception of the error by the user. In some embodiments, an error in the video stream may be intentionally occluded by a graphical distraction.

The distraction insertion application 117 is executed to insert a saccade-inducing distraction into the video stream that is sent to the client 106 in order to mask perception of errors. A distraction may correspond to a flash, a sparkle, a rapid change in contrast, and/or any other unexpected change in the visual field. In various embodiments, a distraction may include a notification with information of interest to the user. As a non-limiting example, a distraction may include a notification to the user that another user has joined or departed a game. As another non-limiting example, a distraction may include a notification to the user of the current connection status of the client 106 to the network 109. Such notifications may be cached until necessary for use in a distraction.

In one embodiment, the distractions are graphically embedded within the video stream. In other embodiments, the distractions are configured to be rendered on top of, alongside, adjacent to, or otherwise in association with the rendered video stream. In still other embodiments, the distractions may be generated through side channels in the client 106. As a non-limiting example, a sound may be played out to distract the user. As another non-limiting example, a text message may be sent to a telephone of the user. Although the distraction insertion application 117 is depicted as being executed in the computing device 103, it is understood that at least a portion of the distraction insertion application 117 may be executed in the client 106 to render distractions in some embodiments.

The wrapper 121 corresponds to an application that provides a virtualized environment for execution of the application 118. In particular, the wrapper 121 may be configured to virtualize one or more of the resources that the application 118 expects to access. Such resources may include a keyboard, a mouse, a joystick, a video device, a sound device, etc. In this way, the wrapper 121 is able to provide input commands to application 118 as if the wrapper 121 emulates a keyboard, a mouse, or another type of input device.

Different types of wrappers 121 may be provided for different applications 118 or classes of applications 118. As non-limiting examples, different wrappers 121 may be provided for applications 118 using different application programming interfaces (APIs) such as OpenGL®, DirectX®, the Graphics Device Interface (GDI), and so on. Where the application 118 is configured for execution in a specialized video game device or another type of computing device, the wrapper 121 may include an emulation application that emulates the device. The wrapper 121 may be configured to deliver the video signal generated by the application 118 to the video encoder 119 for encoding.

The application state information 124 that is maintained by the server application 115 includes various data relating to application sessions that are currently active. For example, the application state information 124 may track the users that are currently participating in the application session, scores and status information associated with the users, security permissions associated with the game session (e.g., who can or cannot join), and so on. In some embodiments, some or all of the application state information 124 may be discarded when an application session ends.

The data stored in the data store 112 includes, for example, applications 127, video encoders 129, wrappers 130, saved state data 133, user data 136, quality monitor configuration data 137, distraction configuration data 138, and potentially other data. The applications 127 correspond to a library of video games or other applications that are available to be launched as applications 118. The applications 127 may correspond to executable code within the computing device 103. Alternatively, the applications 127 may correspond to code that is executable within another type of device but is not executable within the computing device 103. Such applications 127 may be referred to as "binaries," read-only memory images (ROMs), and other terms. A particular application 127 may be executed as multiple instances of the applications 118 for multiple application sessions.

The video encoders 129 correspond to the various types of video encoders 119 that may be employed in the computing device 103. Some video encoders 129 may correspond to specific formats, such as, for example, H.264, MPEG-4, MPEG-2, and/or other formats. The wrappers 130 correspond to the executable code that implements the various types of wrappers 121. The wrappers 130 are executable in the computing device 103 and may be executed as multiple instances of the wrappers 121 for multiple application sessions.

The saved state data 133 corresponds to application states that have been saved by the applications 118. Because the applications 118 are executed in a virtualized environment, the applications 118 may write state information to a virtual location, which is then mapped for storage in the data store 112 as the saved state data 133. The saved state data 133 may correspond to data saved normally by the application 118 or may correspond to a memory image of the application 118 that may be resumed at any time. The user data 136 includes various data related to the users of the applications 118, such as, for example, security credentials, application preferences, billing information, a listing of other users that are permitted to join application sessions started by the user, and so on.

The quality monitor configuration data 137 includes various configuration parameters for the video stream quality monitor 116. For example, such parameters may specify thresholds for the detection of errors that are user perceivable. Such parameters may also specify thresholds for errors that may be masked by saccades. To this end, the quality monitor configuration data 137 may, for example, specify a maximum duration for an error in frame length or time so that the error is predicted to be completely concealed by a saccade. The quality monitor configuration data 137 may specify other actions to be taken (e.g., notifying the user, terminating the session, etc.) when an error is not susceptible to saccade masking.

The distraction configuration data 138 includes various configuration parameters for the distraction insertion application 117. Such parameters may configure, for example, the location of the distraction, the form of the distraction, and/or other aspects of the distraction. Such parameters may specify a sparkle, lightning bolt, flash, sprite, dialog box, and/or other types of visual distractions. In various embodiments, the distraction may be chosen based in part on which application 118 is executed and/or the application state information 124.

The client 106 is representative of a plurality of client devices that may be coupled to the network 109. The clients 106 may be geographically diverse. The client 106 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability.

The client 106 may include a display 139. The display 139 may comprise, for example, one or more devices such as cathode ray tubes (CRTs), liquid crystal display (LCD) screens, gas plasma-based flat panel displays, LCD projectors, or other types of display devices, etc. The client 106 may include one or more input devices 142. The input devices 142 may comprise, for example, devices such as keyboards, mice, joysticks, accelerometers, light guns, game controllers, touch pads, touch sticks, push buttons, optical sensors, microphones, haptic devices, webcams, and/or any other devices that can provide user input.

The client 106 may be configured to execute various applications such as a client application 145 and/or other applications. The client application 145 is executed to allow a user to launch, join, play, and otherwise interact with an application 118 executed in the computing device 103. To this end, the client application 145 is configured to capture input provided by the user through one or more of the input devices 142 and send this input over the network 109 to the computing device 103 as input data 122.

The client application 145 is also configured to obtain video data 123 over the network 109 from the computing device 103 and render a screen 148 on the display 139. To this end, the client application 145 may include one or more video and audio players to play out a video stream generated by a video encoder 119. It is understood that such a video stream is not limited to one encoded from an application 118. Indeed, the principles of the present disclosure may be applicable to television programs, movies, etc.; that is, any video stream that may suffer from errors and to which distractions may be effectively applied. For example, a televised football game may include video encoding errors immediately after kickoff due to the sudden motion. A distraction may be employed to distract the user and disguise such errors.

In various embodiments, the client application 145 may be configured to render a distraction inserted into the video stream by the distraction insertion application 117 in association with the screen 148 on the display 139. In one embodiment, the client application 145 comprises a plug-in within a browser application. The client 106 may be configured to execute applications beyond the client application 145 such as, for example, browser applications, email applications, instant message applications, and/or other applications.

Next, a general description of the operation of the various components of the networked environment 100 is provided. To begin, a user at a client 106 sends a request to launch an application 118 to the server application 115. The server application 115 obtains the corresponding application 127 and wrapper 130 from the data store 112. The server application 115 then launches the application 118 in the corresponding wrapper 121. The server application 115 tracks the status of the game within the application state information 124.

The wrapper 121 provides a virtualized environment for the application 118 that virtualizes one or more resources of the computing device 103. Such resources may include exclusive resources, i.e., resources for which the application 118 requests exclusive access. For example, the application 118 may request full screen access from a video device, which is an exclusive resource because normally only one application can have full screen access. Furthermore, the wrapper may virtualize input devices such as, for example, keyboards, mice, etc., which may not actually be present in the computing device 103. In various embodiments, the wrapper 121 may correspond to a virtual machine and/or the wrapper 121 may be executed within a virtual machine.

The user at the client 106 enters input commands for the application 118 by use of the input devices 142 of the client 106. As a non-limiting example, the user may depress a left mouse button. Accordingly, the client application 145 functions to encode the input command into a format that may be transmitted over the network 109 within the input data 122. The server application 115 receives the input command and passes it to the wrapper 121. The wrapper 121 then provides a left mouse button depression to the application 118 by way of a virtualized mouse. In some embodiments, different input commands may be presented to the application 118 from those that were generated by a client 106. As a non-limiting example, if a user sends a mouse down command and the client application 145 loses focus, the wrapper 121 may be configured to send a mouse down command followed by a mouse up command. In various embodiments, the input commands may be relayed to the wrapper 121 as soon as possible, or the input commands may be queued by the wrapper 121 and relayed to the application 118 sequentially from the queue according to another approach.

Various embodiments enable input generated through one type of input device 142 in a client 106 to be transformed by the wrapper 121 into input commands provided to the application 118 through an entirely different type of virtual input device. As a non-limiting example, input generated by an accelerometer in the client 106 may be translated by the wrapper 121 into input provided through a virtual mouse. Thus, completely different kinds of input devices 142 may be used in interacting with the application 118 that may not have been contemplated when the application 118 was implemented.

Moreover, because the client 106 is decoupled from the hardware requirements of the application 118, the application 118 may be used in a diverse variety of clients 106 that are capable of streaming video with acceptable bandwidth and latency over a network 109. For example, the application 118 may be played on a client 106 that is a smartphone. Thus, the client 106 need not include expensive graphics hardware to perform the complex three-dimensional rendering that may be necessary to execute the application 118. By contrast, the hardware of the computing device 103 may be upgraded, as needed, to meet the hardware requirements of the latest and most computationally intensive applications 118. In various embodiments, the video stream encoded by the video encoder 119 may be scaled according to the bitrate and/or other characteristics of the connection between the computing device 103 and the client 106 over the network 109.

The graphical output of the application 118 is captured by the wrapper 121 and encoded into a video stream. Additionally, the audio output of the application 118 may be captured and multiplexed into the video stream. The video stream is transmitted by the server application 115 to the client 106 over the network 109 as the video data 123. The client application 145 obtains the video data 123 and plays it out on the display 139 in a screen 148.

Figure 2A:
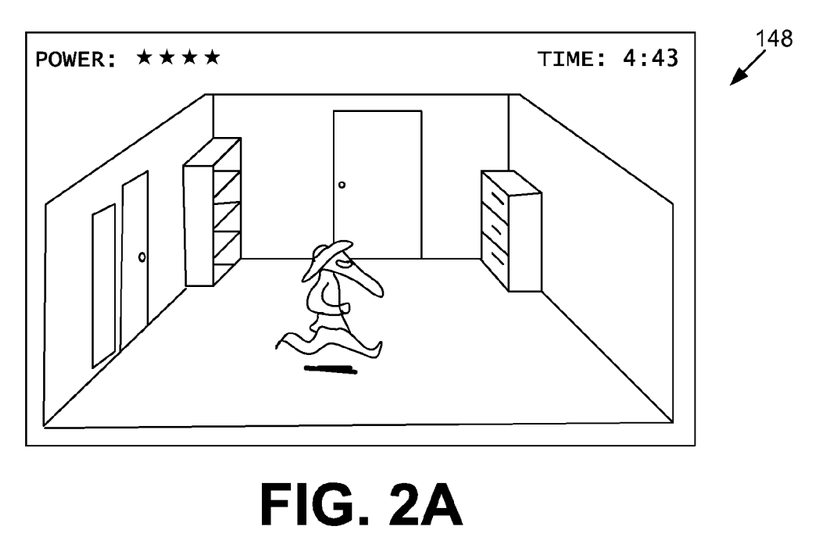
FIGS. 2A-2D and 3 are drawings of user interfaces rendered by a client in the networked environment of FIG. 1 according to various embodiments of the present disclosure.
Figure 2B:
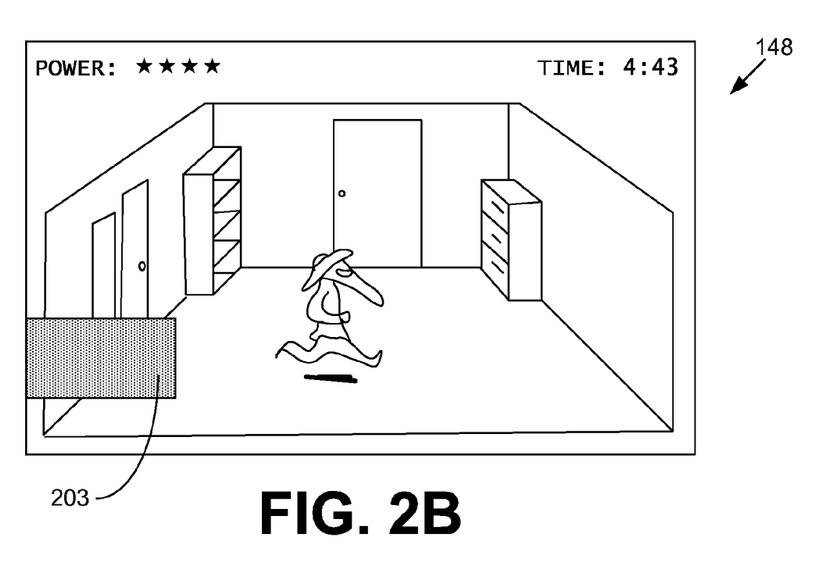

Turning now to FIGS. 2A-2D and 3, shown are examples of user interfaces rendered by the client application 145 (FIG. 1) executed in the client 106 (FIG. 1) in the networked environment 100 (FIG. 1). In particular, FIG. 2A depicts a screen 148 rendered on the display 139 (FIG. 1) from a video stream. No visible errors are shown on the screen 148 of FIG. 2A. In some cases, screens 148 may contain errors that are determined by the video stream quality monitor 116 (FIG. 1) not to be perceivable by users or significant to the users. Unlike the screen 148 of FIG. 2A, the screen 148 of FIG. 2B includes an error 203 that may be perceived by a user and may cause the user to have a degraded playing experience.

Figure 2C:
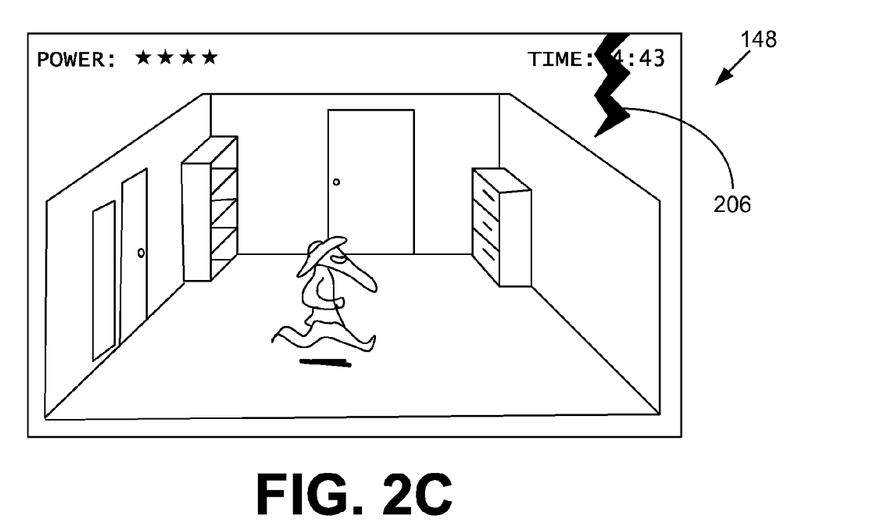
Figure 2D:
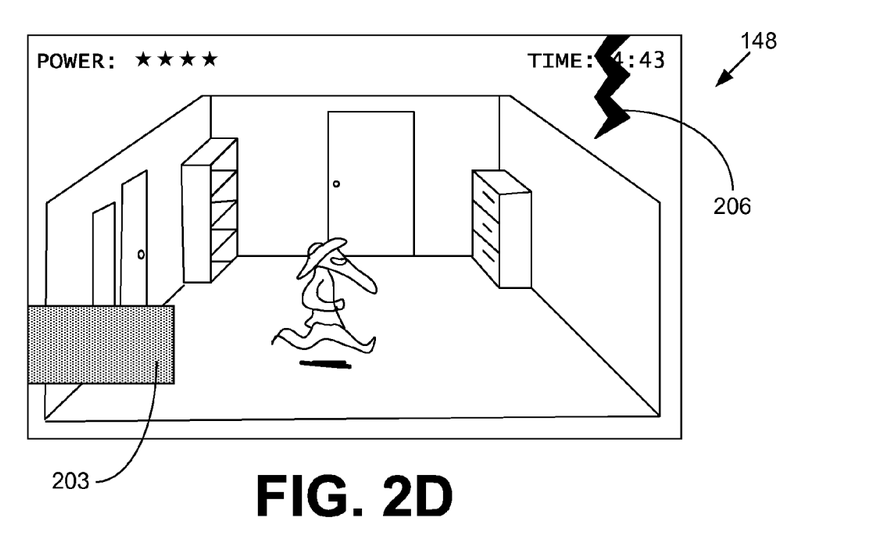

By contrast, the screen 148 of FIG. 2C depicts one non-limiting example of a saccade-inducing distraction 206, which is represented as a lightning bolt at the upper right corner of the screen 148. When the user sees the distraction 206, the attention of the user is directed away from a forthcoming error 203 shown in FIG. 2D and to the distraction 206. In the resulting saccade, the eyes of the user defocus on a portion of the screen 148, are aimed at the distraction 206, and then refocus on the distraction 206. During the saccade, the user is not likely to perceive the error 203. Instead, the portion of the image of FIG. 2A that corresponds to the portion of the screen 148 is likely to persist in the vision of the user. Even if the user were looking at the lower left corner of the screen 148, the user is not likely to see the error 203 during the saccade.

Figure 3:
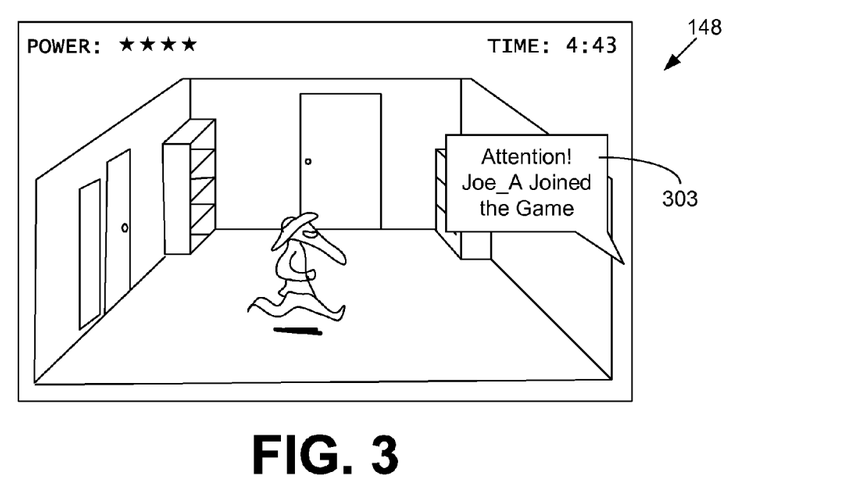

FIG. 3 illustrates another example of a distraction 303 displayed in conjunction with the screen 148. In embodiments such as that of FIG. 3, the distraction 303 may function to notify the user of some useful information. In FIG. 3, the distraction 306 notifies the user that another user has joined the application session. Such information may be cached so as to be ready for presentation in synchronization with the occurrence of an error 203 that may be masked by a saccade. Other non-limiting examples of such information may include connection quality, lists of users participating in an application session, an identification of a user who has left an application session, current application session status, and so on.

With reference back to FIG. 1, the video stream quality monitor 116 may continuously monitor the video stream generated by a video encoder 119 for user-perceivable errors. Such errors may be caused, for example, by encoding artifacts resulting from application-caused effects or lost data resulting from network-caused effects. To this end, the video stream quality monitor 116 may obtain various data from the video encoder 119, the application 118, the server application 115, the client application 145, and/or other applications. The video stream quality monitor 116 may compute a connection quality score from the stream quality metrics 125. If the connection quality score meets a certain threshold for poor quality, the video stream quality monitor 116 may configure the video stream to be dropped entirely rather than to include a distraction. In some embodiments, portions of the video stream quality monitor 116 may be executed in the client 106 rather than the computing device 103.

The video stream quality monitor 116 may anticipate the occurrence of a user-perceivable error based on the occurrence of an event in the application 118. For example, a user may have fired a rocket in the game at a warehouse, and the video stream quality monitor 116 knows that that event is likely to cause a user-perceivable error when encoding the resulting explosion and fireball. To this end, the video stream quality monitor 116 may interface with the application 118 and/or the video encoder 119 to determine whether an event is likely to cause a user-perceivable error.

Such functionality may be applied to many different forms of video streams beyond those generated in conjunction with applications 118. As a non-limiting example, the encoding of the video signal of a televised football game may result in an error at kickoff. At kickoff, the video signal changes dramatically from an essentially stationary image to video that contains a substantial amount of seemingly random motion. Encoding of such video can be difficult and may result in errors. Such errors may be detected by the video encoder 119 and/or anticipated by the video stream quality monitor 116 based, for example, on information that indicates that a kickoff is about to occur. Consequently, a saccade-inducing distraction may be rendered. Additionally, in the example of a televised football game, the distraction may include useful information, such as a current score.

When the video stream quality monitor 116 determines that a distraction is to be included in a video stream, the distraction insertion application 117 performs the insertion. It is noted that portions of the distraction insertion application 117 may be executed in the client 106 rather than the computing device 103. The distraction insertion application 117 configures the distraction to be presented in synchronization with the frames of the video stream that contain the error. In one embodiment, the distraction insertion application 117 embeds the distraction within the video stream to be rendered as an overlay on top of the screen 148. In another embodiment, the distraction insertion application 117 includes an instruction in the video stream to code executed in the client 106 to render the distraction relative to the screen 148 on the display 139.

The distraction insertion application 117 may insert different types of distractions that are to be rendered at different locations on the display 139. After repeated similar distractions, the user may become accustomed to the distractions. Consequently, the distractions may not induce an effective saccade. To overcome this, a random selection of distraction forms may be made. Additionally, the distractions may be rendered at random locations on the display 139. In one embodiment, the distractions are rendered in locations that are different from the locations of previously rendered distractions.

Figure 4:
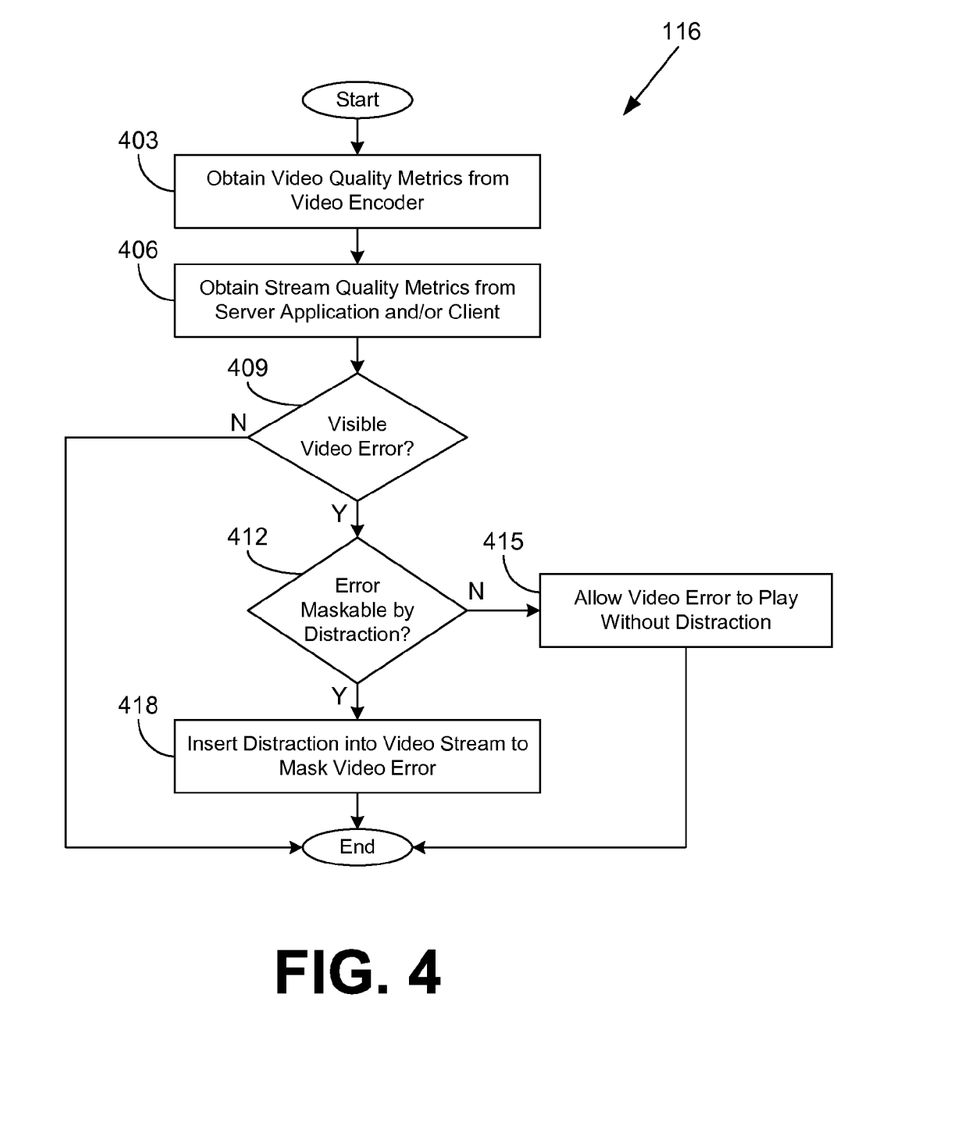
FIG. 4 is a flowchart illustrating one example of functionality implemented as portions of a video stream quality monitor executed in a computing device in the networked environment of FIG. 1 according to various embodiments of the present disclosure.

Referring next to FIG. 4, shown is a flowchart that provides one example of the operation of a portion of the video stream quality monitor 116 according to various embodiments. It is understood that the flowchart of FIG. 4 provides merely an example of the many different types of functional arrangements that may be employed to implement the operation of the portion of the video stream quality monitor 116 as described herein. As an alternative, the flowchart of FIG. 4 may be viewed as depicting an example of steps of a method implemented in the computing device 103 (FIG. 1) according to one or more embodiments.

Beginning with box 403, the video stream quality monitor 116 obtains video quality metrics and/or other data from the video encoder 119 (FIG. 1) that is encoding a video signal into a video stream. Such video quality metrics may indicate whether the video stream includes an error or visual anomaly created by the video encoder 119 that may be perceived by a user. Other data may be obtained that indicates that the video signal generated by the application 118 (FIG. 1) cannot be encoded into the video stream without perceivable encoding artifacts.

In one embodiment, the application 118 and/or the video encoder 119 may provide an indication of an event reflected in the video signal that may cause artifacting in the encoded video stream. As a non-limiting example, an event may occur in the application 118 that causes motion in a corner of the screen 148. It may be the case that this motion cannot be encoded without significant blurring in that corner due to the bitrate, resolution, frame rate, and/or other settings of the video encoder 119. The video encoder 119 may provide data indicating when a frame of the video stream should be dropped.

In box 406, the video stream quality monitor 116 obtains stream quality metrics 125 (FIG. 1) from the server application 115 (FIG. 1) that is serving up the video stream and/or the client 106 (FIG. 1) that is playing out the video stream. As a non-limiting example, the server application 115 may report back to the video stream quality monitor 116 that a data packet of the video stream could not be sent to the client 106 over the network 109. Such problems may be detected, for example, by a TCP stack or another communications protocol stack of the computing device 103. Additionally, stream quality metrics 125 obtained from the client 106 may indicate various problems with the video stream, such as, for example, corrupted data, lost data, client-side processing issues, and so on.

In box 409, the video stream quality monitor 116 determines whether the video stream includes, or will include, a visible video error or anomaly. In other words, the video stream quality monitor 116 determines whether such an error exists, or is predicted to exist, and whether such an error would likely result in a degraded user experience. To this end, the video stream quality monitor 116 may analyze the data obtained in boxes 403 and 406 with respect to various thresholds and/or other parameters of the quality monitor configuration data 137 (FIG. 1). If no visible video error is detected, the video stream is permitted to be sent to the client 106 for rendering on the display 139 (FIG. 1), and the portion of the video stream quality monitor 116 ends. Otherwise, if a visible video error is detected, the video stream quality monitor 116 proceeds to box 412.

In box 412, the video stream quality monitor 116 determines whether the visible video error is susceptible to masking by a saccade-inducing distraction. As a saccade will only interfere with visual perception during an approximately 30 to 50 millisecond time period, a saccade may not prevent the user from perceiving errors that persist for a longer duration. In one embodiment, the saccade time period may correspond to two to three frames of the video stream. Again, the video stream quality monitor 116 may analyze the data obtained in boxes 403 and 406 with respect to various thresholds and/or other parameters of the quality monitor configuration data 137.

When the visible video error cannot be masked by a distraction, the video stream quality monitor 116 moves to box 415 and allows the video error to play out in the client 106 without a distraction. In some cases, a notification may be provided to the user to explain that a problem is occurring. If the problem is severe enough, the application session and transmission of the video stream may, for example, be suspended or terminated. Thereafter, the portion of the video stream quality monitor 116 ends.

When the visible video error can be masked by a distraction, the video stream quality monitor 116 proceeds to box 418 and configures the video stream to include at least one distraction to mask the error. To this end, the video stream quality monitor 116 may direct the distraction insertion application 117 to insert the distraction. The distraction insertion application 117 then ensures that the distraction is rendered in synchronization with the visible video error to take advantage of saccade masking. Thereafter, the portion of the video stream quality monitor 116 ends.

Figure 5:
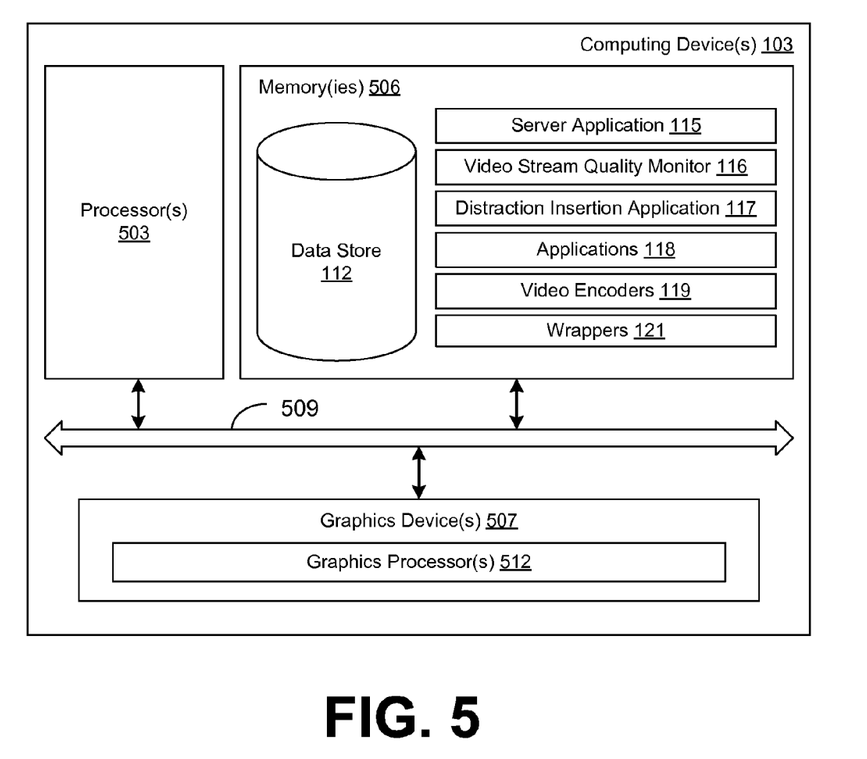
FIG. 5 is a schematic block diagram that provides one example illustration of a computing device employed in the networked environment of FIG. 1 according to various embodiments of the present disclosure.

With reference to FIG. 5, shown is a schematic block diagram of the computing device 103 according to an embodiment of the present disclosure. The computing device 103 includes at least one processor circuit, for example, having a processor 503, a memory 506, and one or more graphics devices 507, all of which are coupled to a local interface 509. To this end, the computing device 103 may comprise, for example, at least one server computer or like device. The local interface 509 may comprise, for example, a data bus with an accompanying address/control bus or other bus structure as can be appreciated. The graphics devices 507 may correspond to high-performance graphics hardware, including one or more graphics processors 512. Non-limiting examples of commercially available graphics processors 512 include the NVIDIA® Tesla series. The graphics devices 507 are configured to render graphics corresponding to the applications 118 executed in the computing device 103.

Stored in the memory 506 are both data and several components that are executable by the processor 503. In particular, stored in the memory 506 and executable by the processor 503 are the server application 115, the video stream quality monitor 116, the distraction insertion application 117, the applications 118, the video encoders 119, the wrappers 121, and potentially other applications. Also stored in the memory 506 may be a data store 112 and other data. In addition, an operating system may be stored in the memory 506 and executable by the processor 503.

It is understood that there may be other applications that are stored in the memory 506 and are executable by the processors 503 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Delphi®, Flash®, or other programming languages.

A number of software components are stored in the memory 506 and are executable by the processor 503. In this respect, the term "executable" means a program file that is in a form that can ultimately be run by the processor 503. Examples of executable programs may be, for example, a compiled program that can be translated into machine code in a format that can be loaded into a random access portion of the memory 506 and run by the processor 503, source code that may be expressed in proper format such as object code that is capable of being loaded into a random access portion of the memory 506 and executed by the processor 503, or source code that may be interpreted by another executable program to generate instructions in a random access portion of the memory 506 to be executed by the processor 503, etc. An executable program may be stored in any portion or component of the memory 506 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 506 is defined herein as including both volatile and nonvolatile memory and data storage components. Volatile components are those that do not retain data values upon loss of power. Nonvolatile components are those that retain data upon a loss of power. Thus, the memory 506 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 503 may represent multiple processors 503 and the memory 506 may represent multiple memories 506 that operate in parallel processing circuits, respectively. In such a case, the local interface 509 may be an appropriate network 109 (FIG. 1) that facilitates communication between any two of the multiple processors 503, between any processor 503 and any of the memories 506, or between any two of the memories 506, etc. The local interface 509 may comprise additional systems designed to coordinate this communication, including, for example, performing load balancing. The processor 503 may be of electrical or of some other available construction.

Although the server application 115, the video stream quality monitor 116, the distraction insertion application 117, the applications 118, the video encoders 119, the wrappers 121, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowchart of FIG. 4 shows the functionality and operation of an implementation of portions of the video stream quality monitor 116. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 503 in a computer system or other system. The machine code may be converted from the source code, etc. If embodied in hardware, each block may represent a circuit or a number of interconnected circuits to implement the specified logical function(s).

Although the flowchart of FIG. 4 shows a specific order of execution, it is understood that the order of execution may differ from that which is depicted. For example, the order of execution of two or more blocks may be scrambled relative to the order shown. Also, two or more blocks shown in succession in FIG. 4 may be executed concurrently or with partial concurrence. Further, in some embodiments, one or more of the blocks shown in FIG. 4 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the server application 115, the video stream quality monitor 116, the distraction insertion application 117, the applications 118, the video encoders 119, and the wrappers 121, that comprises software or code can be embodied in any non-transitory computer-readable medium for use by or in connection with an instruction execution system such as, for example, a processor 503 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying at least one program executable in at least one computing device, comprising:
   code that renders a video stream for display; and
   code that generates a distraction that is designed to interfere with perception by a viewer of at least one anomaly in the video stream, wherein the at least one anomaly comprises at least one error in the video stream.

2. The non-transitory computer-readable medium of claim 1, wherein the distraction is generated in response to detecting the at least one anomaly in the video stream.

3. The non-transitory computer-readable medium of claim 1, wherein the distraction is generated in response to detecting a data loss or corruption in the video stream.

4. The non-transitory computer-readable medium of claim 1, further comprising code that renders the distraction in a random location on a display.

5. The non-transitory computer-readable medium of claim 1, wherein the distraction is designed to induce a saccade in the viewer.

6. A system, comprising:
   at least one computing device configured to at least:
      determine that an error in a video signal may be user perceivable; and
      generate a distraction that is designed to interfere with perception of the error by a user.

7. The system of claim 6, wherein the at least one computing device is further configured to:
   generate a video stream by encoding the video signal; and
   embed the distraction in the video stream.

8. The system of claim 6, wherein the at least one computing device is further configured to:
   render the video signal upon a display; and
   render the distraction upon the display.

9. The system of claim 8, wherein the distraction is rendered in a different location on the display than a second distraction that was previously rendered on the display.

10. The system of claim 6, wherein the distraction is designed to cause the user to experience a saccade.

11. The system of claim 6, wherein the distraction comprises a visual distraction.

12. The system of claim 6, wherein the distraction comprises a notification to the user.

13. The system of claim 6, wherein the error comprises an encoding artifact.

14. The system of claim 6, wherein the error comprises lost or corrupted data.

15. A method, comprising:
   determining, via at least one of one or more computing devices, that an anomaly in a video stream may be user perceivable, the anomaly comprising an error in the video stream;
   generating, via at least one of the one or more computing devices, a distraction designed to mask user perception of the anomaly; and
   sending, via at least one of the one or more computing devices, data that enables the distraction to a client computing device.

16. The method of claim 15, wherein the distraction facilitates saccadic masking of the anomaly.

17. The method of claim 15, further comprising embedding, via at least one of the one or more computing devices, the data that enables the distraction in the video stream.

18. The method of claim 15, further comprising determining, via at least one of the one or more computing devices, that the anomaly meets a threshold associated with predicted user perception of the anomaly.

19. The method of claim 15, further comprising detecting, via at least one of the one or more computing devices, the anomaly in the video stream based at least in part on an indication that a portion of the video stream has not been received by the client computing device.

20. The method of claim 15, further comprising detecting, via at least one of the one or more computing devices, the anomaly in the video stream based at least in part on data received from a video encoder that generates the video stream from a video signal.

* * * * *